(12) United States Patent
Liu et al.

(10) Patent No.: US 10,548,445 B2
(45) Date of Patent: Feb. 4, 2020

(54) WHEEL DRIVING DEVICE AND CLEANER ROBOT HAVING THE SAME

(71) Applicant: NIDEC CORPORATION, Kyoto (JP)

(72) Inventors: Chun-Hsien Liu, Kyoto (JP); Hiroyuki Ichizaki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 335 days.

(21) Appl. No.: 15/413,420

(22) Filed: Jan. 24, 2017

(65) Prior Publication Data

US 2017/0209015 A1 Jul. 27, 2017

(30) Foreign Application Priority Data

Jan. 26, 2016 (TW) .............................. 105102298 A

(51) Int. Cl.
| | |
|---|---|
| *A47L 9/04* | (2006.01) |
| *A47L 11/24* | (2006.01) |
| *A47L 11/40* | (2006.01) |
| *F16H 1/22* | (2006.01) |
| *F16C 1/02* | (2006.01) |
| *B60K 17/04* | (2006.01) |
| *B60K 17/28* | (2006.01) |
| *B60K 25/06* | (2006.01) |
| *B60K 1/02* | (2006.01) |
| *B25J 5/00* | (2006.01) |

(Continued)

(52) U.S. Cl.
CPC ............. *A47L 11/24* (2013.01); *A47L 9/0427* (2013.01); *A47L 9/0433* (2013.01); *A47L 11/4069* (2013.01); *B25J 5/007* (2013.01); *B60K 1/02* (2013.01); *B60K 17/043* (2013.01); *B60K 17/28* (2013.01); *B60K 25/06* (2013.01); *F16C 1/02* (2013.01); *F16H 1/222* (2013.01); *B60K 2025/005* (2013.01); *F16H 2057/02034* (2013.01); *F16H 2057/02039* (2013.01); *G05D 2201/0203* (2013.01)

(58) Field of Classification Search
CPC .... A47L 9/0411; A47L 9/0427; A47L 9/0433; A47L 11/24; A47L 11/4069; A47L 2201/00; B60K 17/02
See application file for complete search history.

(56) References Cited

U.S. PATENT DOCUMENTS

| | | | |
|---|---|---|---|
| 2,518,183 | A | 8/1950 | Renne |
| 7,441,298 | B2 | 10/2008 | Svendsen et al. |

(Continued)

FOREIGN PATENT DOCUMENTS

| | | |
|---|---|---|
| CN | 103654640 | 3/2014 |
| CN | 204146956 | 2/2015 |

(Continued)

*Primary Examiner* — Randall E Chin
(74) *Attorney, Agent, or Firm* — JCIPRNET

(57) ABSTRACT

A wheel driving device includes: a motor rotating a shaft: an input gear fixed to the shaft; at least one transmission gear meshed with the input gear to transmit power of the motor; and a final gear meshed with the transmission gear and connected with a wheel via an axis to transmit the power from the transmission gear to the wheel. The wheel driving device includes an extraction gear meshed with the final gear or the transmission gear, and a power transmission part connected with the extraction gear to transmit the power from the extraction gear to a cleaner head.

12 Claims, 10 Drawing Sheets

(51) Int. Cl.
  *F16H 57/02*  (2012.01)
  *B60K 25/00*  (2006.01)

(56) References Cited

U.S. PATENT DOCUMENTS

| | | |
|---|---|---|
| 8,380,350 B2 | 2/2013 | Ozick et al. |
| 8,584,305 B2 | 11/2013 | Won et al. |
| 8,584,307 B2 | 11/2013 | Won et al. |
| 8,606,401 B2 | 12/2013 | Ozick et al. |
| 8,954,192 B2 | 2/2015 | Ozick et al. |
| 9,144,360 B2 | 9/2015 | Ozick et al. |
| 9,149,170 B2 | 10/2015 | Ozick et al. |
| 2005/0155169 A1 | 7/2005 | Cheah et al. |
| 2008/0282494 A1 | 11/2008 | Won et al. |
| 2009/0019661 A1* | 1/2009 | Seo ................ A47L 9/0422 15/300.1 |
| 2012/0090133 A1 | 4/2012 | Kim et al. |
| 2012/0173064 A1 | 7/2012 | Won et al. |
| 2014/0026354 A1 | 1/2014 | Won et al. |
| 2014/0352103 A1 | 12/2014 | Won et al. |
| 2015/0223653 A1 | 8/2015 | Kim et al. |
| 2016/0058256 A1 | 3/2016 | Ju et al. |
| 2016/0075024 A1 | 3/2016 | Ozick et al. |
| 2016/0081525 A1* | 3/2016 | Kim ................ A47L 11/4066 15/340.1 |
| 2016/0166127 A1* | 6/2016 | Lewis ................ A47L 9/02 15/49.1 |
| 2016/0291595 A1 | 10/2016 | Halloran et al. |

FOREIGN PATENT DOCUMENTS

| | | |
|---|---|---|
| CN | 204146958 | 2/2015 |
| CN | 204971121 | 1/2016 |
| CN | 204971122 | 1/2016 |
| EP | 2417892 | 2/2012 |
| EP | 2907437 | 8/2015 |
| JP | 2011-161242 | 8/2011 |
| KR | 100779195 | 11/2007 |
| TW | M489223 | 11/2014 |
| WO | 2007065034 | 6/2007 |

\* cited by examiner

WHEEL DRIVING DEVICE AND CLEANER ROBOT HAVING THE SAME

CROSS-REFERENCE TO RELATED APPLICATION

This application claims the priority benefit of Taiwan Application no. 105102298, filed on Jan. 26, 2016. The entirety of the above-mentioned patent application is hereby incorporated by reference herein and made a part of this specification.

BACKGROUND OF THE INVENTION

Field of the Invention

The present invention relates to a wheel driving device and a cleaner robot having a wheel driving device.

Description of the Related Art

Among home appliances, self-propelled cleaners, or so-called cleaner robots, which automatically clean the floor, have become common equipment. For example, JP 2011-161242 discloses a conventional cleaner robot. In the cleaner robot described in JP 2011-161242, a plurality of motors are arranged, which are, respectively, one for driving a blower, two for driving a wheel driving device, one for driving a main brush, and one (or two) for driving a subbrush. In addition, the cleaner robot generally has rechargeable batteries arranged therein, and electricity is provided to each of the motors through the batteries.

However, in the cleaner robot described in JP 2011-161242, individual motors are required for driving the wheel, the main brush, the subbrush and so on, and it is necessary to supply electricity to each of the motors for operation. Thus, the power consumption of the cleaner robot is increased. In addition, since the cleaner robot is driven by batteries, the amount of the power consumption influences operating time of the cleaner robot. Furthermore, if the power is consumed too fast, after driving of the cleaner robot is started, the cleaner robot must frequently return to a charging station to charge itself up, and cleaning efficiency of the cleaner robot is thus reduced.

SUMMARY OF THE INVENTION

A wheel driving device according to an exemplary embodiment of the present invention is a wheel driving device including: a motor rotating a shaft; an input gear fixed to the shaft; at least one transmission gear meshed with the input gear to transmit power of the motor; and a final gear meshed with the transmission gear and connected with a wheel via an axis to transmit the power from the transmission gear to the wheel, wherein the wheel driving device includes an extraction gear meshed with the final gear or the transmission gear, and a power transmission part connected with the extraction gear to transmit the power from the extraction gear to a cleaner head.

According to the wheel driving device related to an exemplary embodiment of the present disclosure, the power consumption of the wheel driving device can be reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENT

A wheel driving device according to an embodiment of the present invention is hereinafter explained with reference to the drawings.

Figure 1A:
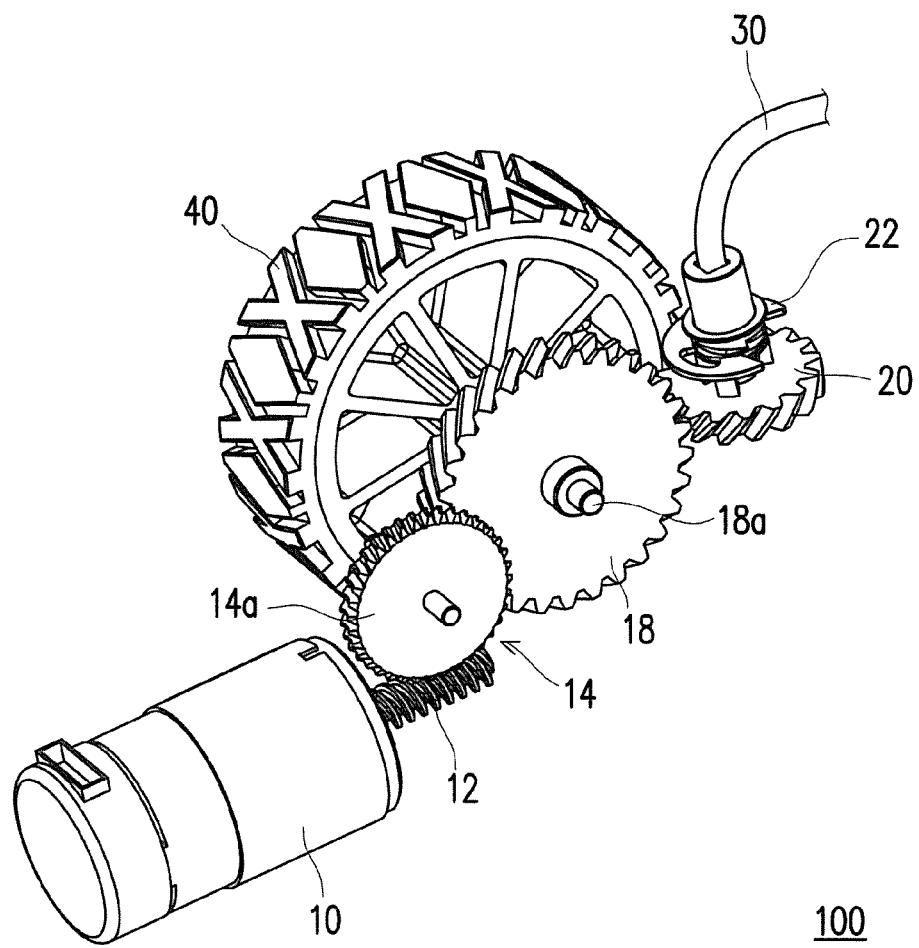
FIG. 1A is a perspective view of a wheel driving device of the first embodiment.
Figure 1B:
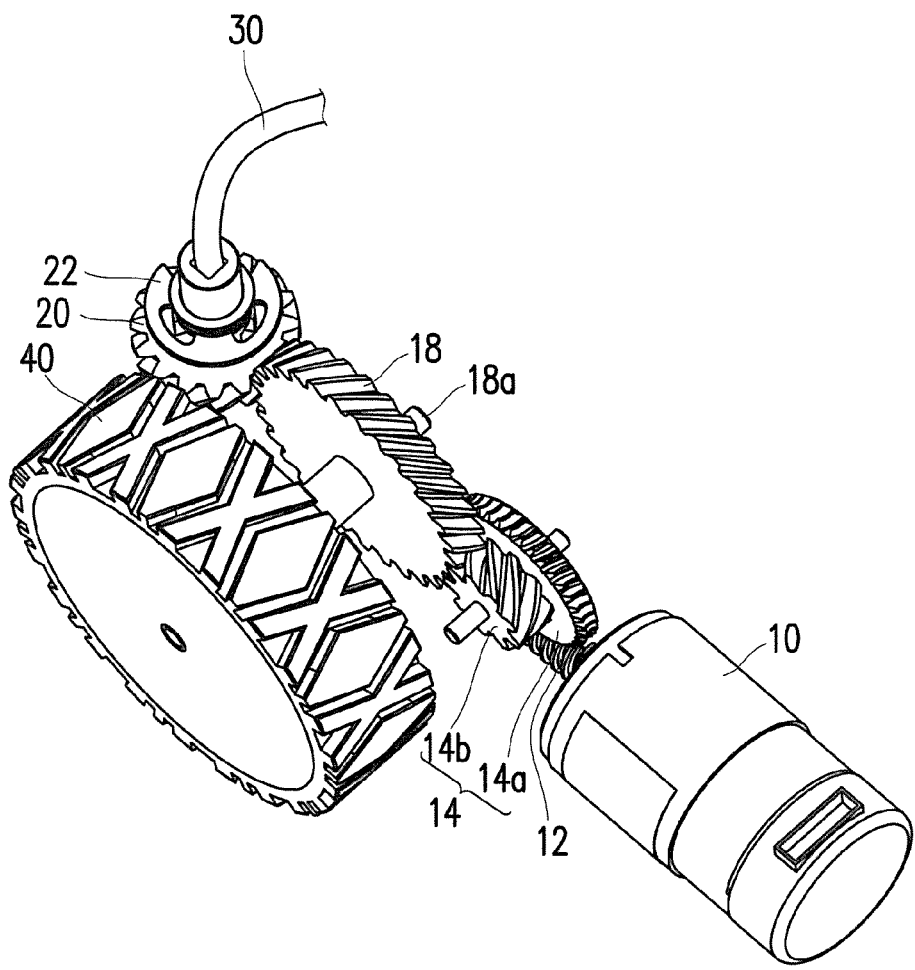
FIG. 1B is a perspective view of the wheel driving device of the first embodiment.

FIG. 1A and FIG. 1B are three-dimensional views showing one of a pair of wheel driving devices 100 in an exemplary first embodiment of the present invention, and are respectively perspective views as viewed from different angles. The pair of wheel driving devices 100 can be utilized for a travel unit of a cleaner robot. The wheel driving device 100 of the present embodiment mainly includes a motor 10 and a gear set, and is capable of using one motor 10 to simultaneously drive a wheel 40 and a cleaner head of the cleaner robot.

The wheel driving device 100 shown in FIG. 1A and FIG. 1B is merely an example and shall not limit the implementation scope of the present invention. Persons skilled in the art may change the arrangement of the gears and so on according to required functions or needs.

As shown in FIG. 1A and FIG. 1B, the wheel driving device 100 of the first embodiment includes the motor 10, an input gear 12, at least one transmission gear 14, a final gear 18, an extraction gear 20 and a power transmission part 30. In the wheel driving device 100, the motor 10 is mainly for providing power. By outputting the power through the motor 10 to rotate a shaft 10a of the motor 10, the gear set at the rear is driven. That is, the motor 10 rotates the shaft 10a. In the present embodiment, a brush motor, for example, may be employed as the motor 10.

The input gear 12 is fixed to the shaft 10a of the motor 10. The input gear 12 is, for example, a worm gear, and the worm gear is rotated through rotation of the shaft 10a. The wheel driving device 100 further includes at least one transmission gear 14, wherein the transmission gear 14 is rotated by rotation of the won't gear, and the power of the motor 10 is transmitted to the final gear 18 on the rear side. That is, the transmission gear 14 is meshed with the input gear 12 to transmit the power of the motor 10. In the first embodiment, the transmission gear 14, for example, includes a worm wheel 14a and a gear 14b, and the worm wheel 14a and the gear 14b are fixed together through an axis and are rotated in synchronization. Numbers of teeth of the worm wheel 14a and the gear 14b may be the same or different, and may be designed according to actual requirements. As shown in FIG. 1A and FIG. 1B, the worm wheel 14a is meshed with the input gear 12 (i.e., the worm gear), and the input gear 12 is interlocked with rotation of the worm wheel 14a and further interlocked with rotation of the gear 14b.

In addition, the final gear 18 is meshed with the transmission gear 14, and in the first embodiment, the final gear 18 is meshed with the gear 14b, and thereby the power of the motor 10 is transmitted to the final gear 18. In addition, as shown in FIG. 1A or FIG. 1B, the final gear 18 further has an axis 18a and is connected with the wheel 40 through the axis 18a. Accordingly, the power outputted from the motor 10, after being reduced in speed via the input gear 12, the transmission gear 14 (14a and 14b) and the final gear 18, rotates the axis 18a to drive the wheel 40. That is, the final gear 18 is meshed with the transmission gear 14 and is connected with the wheel 40 via the axis 18a, so as to transmit the power from the transmission gear 14 to the wheel 40.

In addition, the wheel driving device 100 further includes the extraction gear 20, and the extraction gear 20 is meshed with the final gear 18. The extraction gear 20 transmits the power of the motor 10 to the cleaner head (not illustrated). That is, as shown in FIG. 1A and FIG. 1B, the power transmission part 30 is connected with the extraction gear 20 to transmit the power from the extraction gear 20 to the cleaner head. That is, the extraction gear 20 is meshed with the final gear 18. However, the extraction gear 20 may also be meshed with the transmission gear 14. Moreover, the power in the present embodiment is power generated by the motor 10. Accordingly, the wheel 40 and the cleaner head of the later-described cleaner robot can be simultaneously driven using one motor 10. In addition, in the wheel driving device 100 and the cleaner robot using the wheel driving device 100, number of motors mounted in a product can be decreased. Accordingly, the power consumption of the product can be reduced. Furthermore, the wheel driving device 100 or the cleaner robot becomes more flexible in design.

In addition, regarding speed reduction ratios of the gear set, a speed reduction ratio of the final gear 18 (i.e., the wheel part) to the shaft 10a may be designed to be greater than or smaller than a speed reduction of the extraction gear 20 (i.e., the cleaner head part) to the shaft 10a. If the cleaner head is rotated too fast, it may cause small dust to fly around; if too slow, there is a possibility that large dust (such as rice grains or the like) may fail to be cleaned up. Accordingly, in designing the speed reduction ratios of the gears, the design can be performed according to operating environment requirements.

As mentioned above, the wheel driving device 100 in the first embodiment is capable of transmitting the power of the motor 10 simultaneously to the wheel 40 and the cleaner head through the above-mentioned gear set. Accordingly, since the wheel 40 and the cleaner head can be simultaneously driven by only one motor 10, the number of motors mounted in the product can be decreased, and power consumption of the whole cleaner robot can be reduced.

In addition, the above-mentioned power transmission part 30 is swingably or flexibly attached to a main body of the wheel driving device 100. That is, the power transmission part 30 preferably includes a member having flexibility. For example, the power transmission part 30 is preferably a flexible shaft or a timing belt, or the like. Accordingly, when the wheel driving device 100 is attached inside the cleaner robot, the power transmission part 30 can be freely arranged in an internal space of the cleaner robot, and space can be created in the internal space to accommodate a larger suction module, or a dust collection box can be increased in size, so that cleaning capability can be improved. Furthermore, since the power transmission part 30 has flexibility, the cleaner head can be arranged in the most suitable position without limitation, and cleaning effects can be further improved.

In addition, as shown in FIG. 1A and FIG. 1B, the wheel driving device 100 further includes a one-way clutch 22. The one-way clutch 22 is arranged between the power transmission part 30 and the extraction gear 20. Accordingly, when a device body of the cleaner robot moves forward, the cleaner head is rotated; when the device body moves backward, the cleaner head is not rotated. Accordingly, it suppresses that when the device body moves backward, reverse rotation of the cleaner head causes trash or dust to fly around so as to render the cleaning incomplete.

Figure 2:
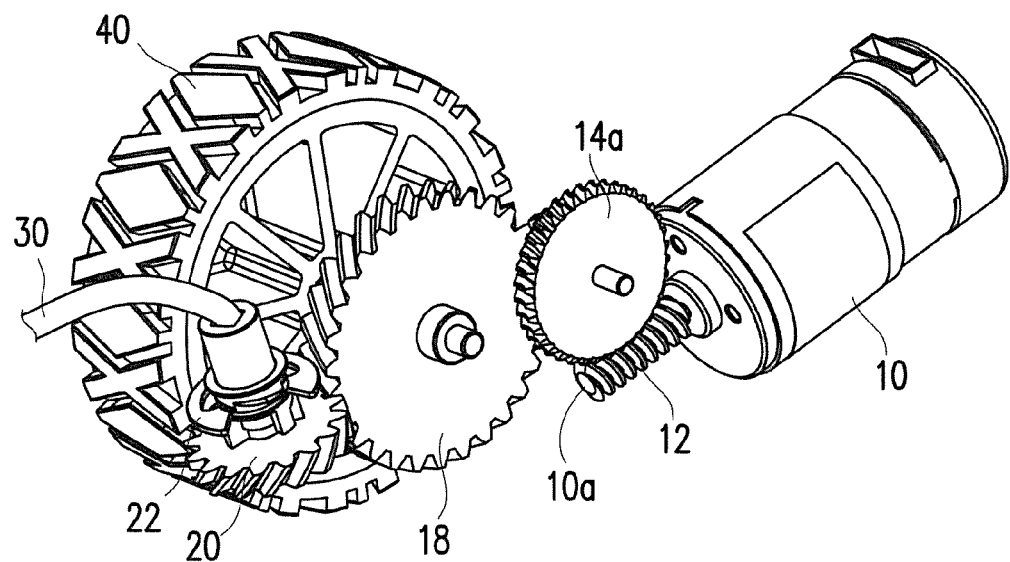
FIG. 2 is a perspective view of the wheel driving device of the first embodiment.
Figure 3:
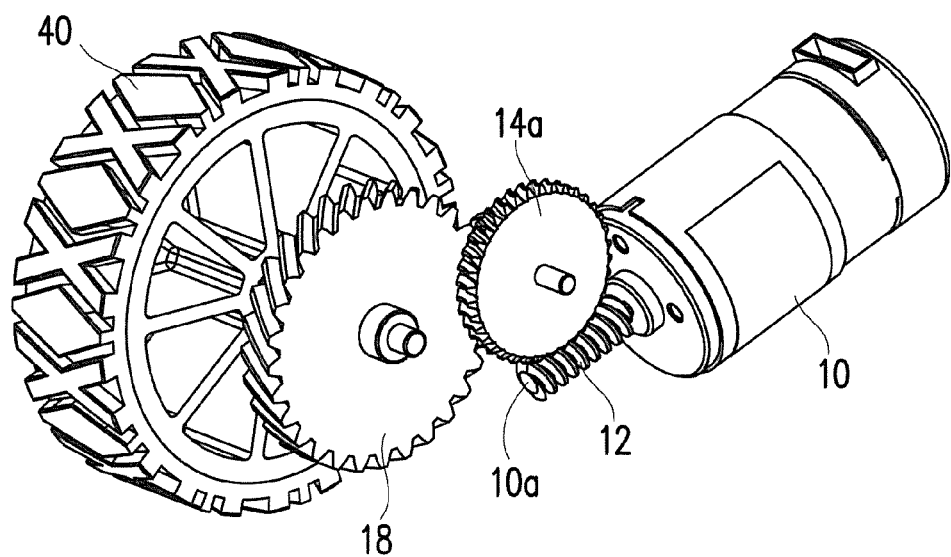
FIG. 3 is a perspective view showing a variant of the wheel driving device of the first embodiment.

In addition, the travel unit of general cleaner robots can include a pair of the above-mentioned wheel driving devices 100. By driving a pair of the wheels 40, the cleaner robot is made to travel on a floor surface to carry out a cleaning operation on the floor surface. FIG. 2 is a three-dimensional view showing the other of the pair of wheel driving devices 100 in the first embodiment of the present invention. That is, in this example, the pair of wheel driving devices 100 of the travel unit of the cleaner robot both have the same structure and differ only in arrangement directions of the wheel 40 and the gears. FIG. 3 is a three-dimensional view showing a variant example of the other of the pair of wheel driving devices 100 in the exemplary first embodiment of the present invention. A difference between FIG. 3 and FIG. 2 is that the structure shown in FIG. 3 does not include the extraction gear 20 and the power transmission part 30. That is, the structure in FIG. 3 only includes the wheel 40. Moreover, in the actual arrangement of the travel unit, the pair of wheel driving devices 100 may employ the same structure. That is, the wheel 40 and the cleaner head can be driven by the single motor 10 shown in FIG. 1A, FIG. 1B and FIG. 2. Or, on one side, the wheel driving device (as in FIG. 1A and FIG. 1B) capable of simultaneously driving the wheel 40 and the cleaner head can be employed, while on the other side, the wheel driving device (as in FIG. 3) driving only the wheel 40 can be employed.

Figure 4:
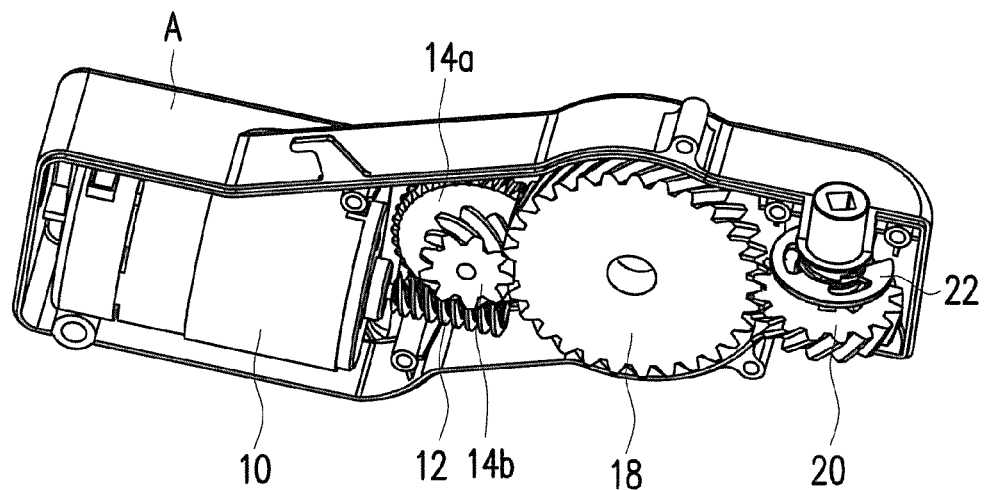
FIG. 4 is a schematic cross-sectional view of an embodiment in which the wheel driving device is modularized.
Figure 5:
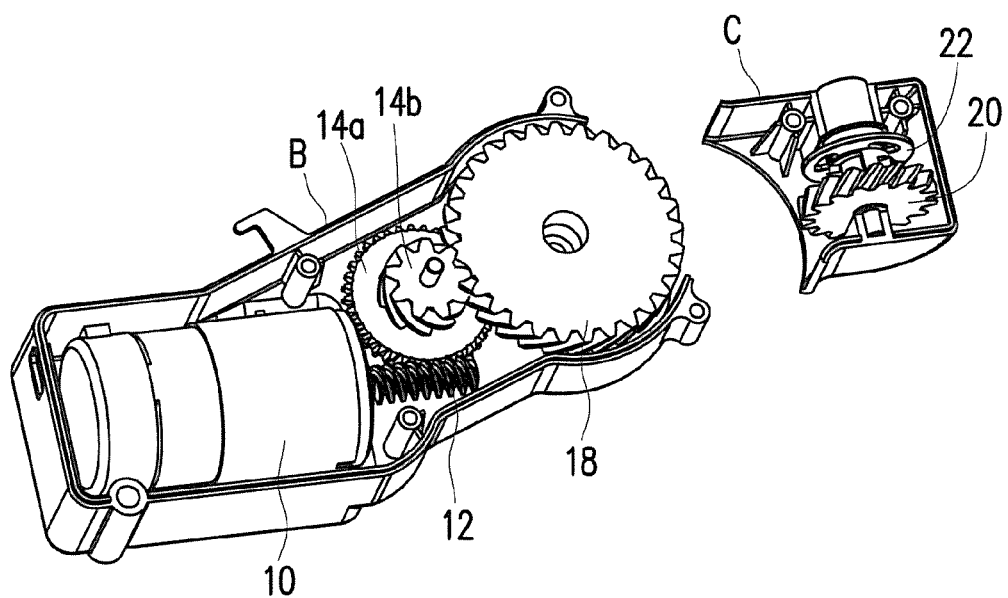
FIG. 5 is a schematic cross-sectional view showing a variant of the embodiment in which the wheel driving device is modularized.

In addition, in actual application, the wheel driving device 100 can further have a modularized design. FIG. 4 is a schematic cross-sectional view showing an example in which the wheel driving device 100 is modularized. That is, a single module A is configured by integrating the motor 10, the input gear 12, the transmission gear 14, the final gear 18 and the extraction gear 20. Furthermore, as shown in FIG. 5, in another example, a first module B is formed by integrating the motor 10, the input gear 12, the transmission gear 14 and the final gear 18, and a second module C includes the extraction gear 20. Through the modularized design, attachment of the wheel driving device can be further simplified.

Figure 6:
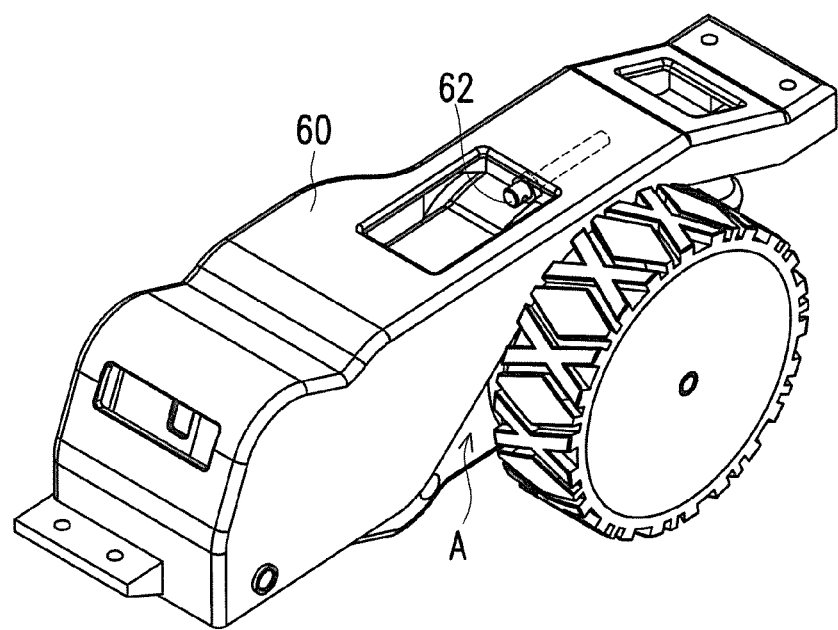
FIG. 6 is a schematic view showing a damping adjustment part in the wheel driving device.

FIG. 6 is a schematic view showing a damping adjustment part 62 applied in the wheel driving device 100. As shown in FIG. 6, the module A of the wheel driving device 100 may be accommodated in a cover housing 60. Through the structure of the module A and the cover housing 60, a damping effect can be provided to the wheel driving device 100. The damping of the travel unit of general cleaner robots is fixed. However, in the present embodiment, since the damping adjustment part 62 is provided, the damping can be properly adjusted. Generally, damping adjustment is often performed at the development stage of a product. Nonetheless, the damping adjustment may also be performed to a final product by a user on his/her own.

Figure 7A:
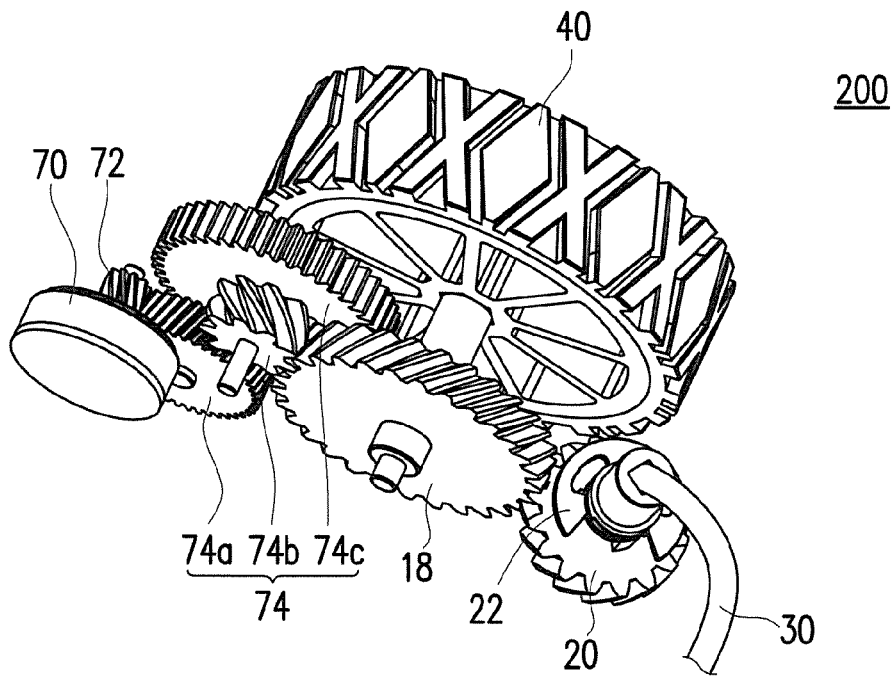
FIG. 7A is a perspective view showing a variant of the wheel driving device of the first embodiment.
Figure 7B:
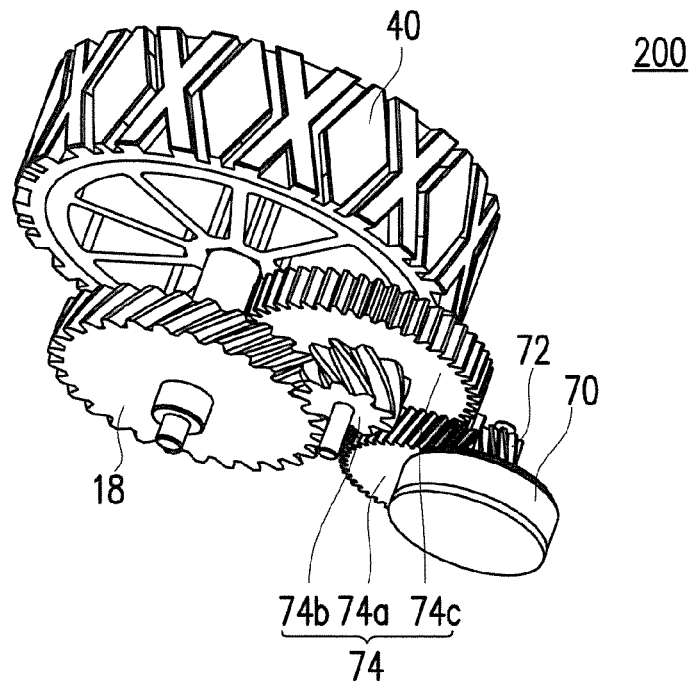
FIG. 7B is a perspective view showing a variant of the wheel driving device of the first embodiment.

FIGS. 7A and 7B are three-dimensional views showing a variant of the pair of wheel driving devices 100 in the first embodiment of the present invention. FIG. 7A and FIG. 7B differ from FIG. 1A and FIG. 1B in a motor 70, an input gear 72 and a transmission gear 74. Herein, the motor 70 is, for example, a brushless motor. In the present embodiment, the transmission gear 74 includes three gears 74a, 74b and 74c. Except for the above-mentioned differences, overall operation and characteristics of a wheel driving device 200 are basically the same as those of the structure shown in FIG. 1A and FIG. 1B, and explanation thereof is omitted herein. In addition, as mentioned above, similarly, a pair of wheel driving devices 200 of the travel unit can both employ the structure (only in opposite directions and positions) in FIG. 7A, or one of the pair of wheel driving devices 200 can employ the wheel driving device in FIG. 7A and the other can employ the wheel driving device in FIG. 7B.

Figure 8A:
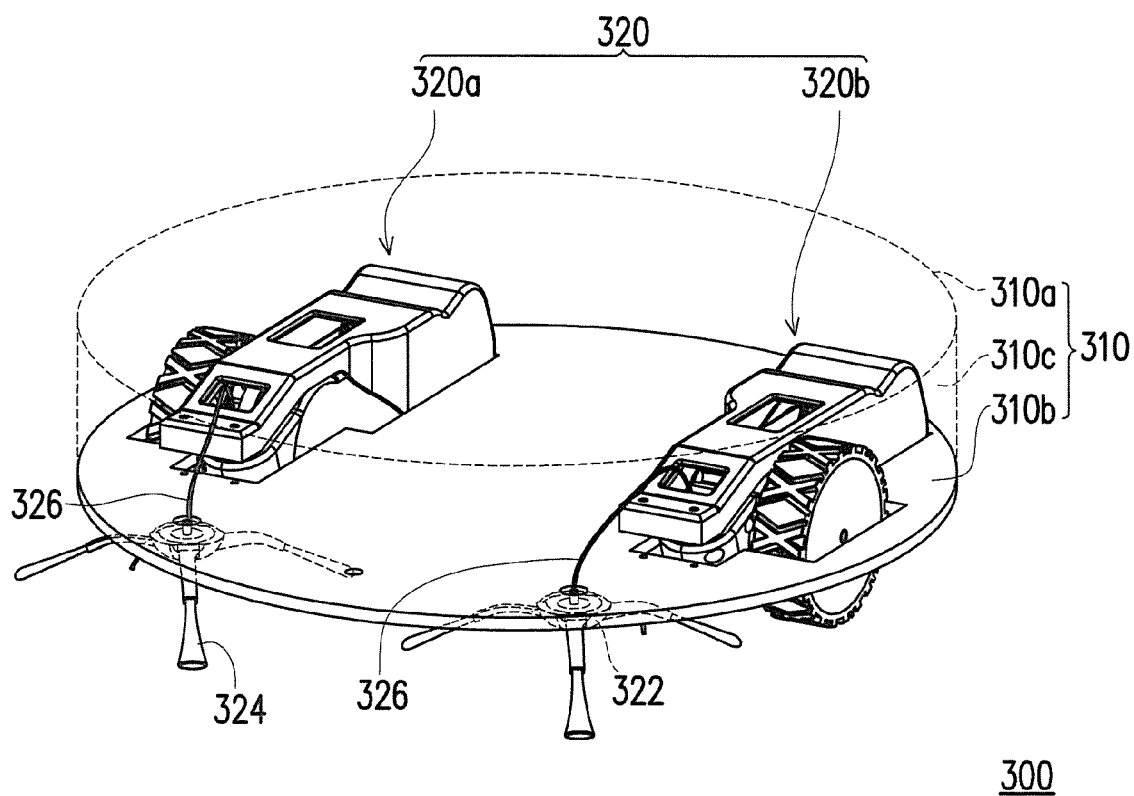
FIG. 8A is a perspective view showing a cleaner robot.

FIG. 8A shows a second embodiment of the present invention. The second embodiment is an explanatory example describing a variation between various arrangements of a cleaner robot 300 that uses the above-mentioned wheel driving device. Several examples are given herein. However, in reality, more variations are possible based on requirements.

The cleaner robot 300 at least includes a housing 310 and a travel unit 320, and the other conventional components are not shown in detail herein. The housing 310 includes a base 310b, a cover 310a, and a sidewall 310c surrounding the base 310b and the cover 310a. In this example, the housing 310 is shown in a flat cylindrical shape. However, in reality, the design of the housing 310 can be changed as required.

As shown in FIG. 8A, the travel unit 320 is arranged on the base 310b inside the housing 310. The travel unit 320 includes at least one pair of wheel driving devices 320a and 320b. In FIG. 8A, the wheel driving devices 320a and 320b are modularized as shown, having a damping part and a cover housing. However, inside the module, the pair of wheel driving devices 320a and 320b are basically the wheel driving devices as explained in the first embodiment and the variant example thereof. Herein, at least one of the pair of wheel driving devices 320a and 320b may be the wheel driving device 100 of the first embodiment. That is, an arbitrary wheel driving device can be employed in accordance with the desired characteristics of wheel driving devices. In the wheel driving device 100 and the cleaner robot using the wheel driving device 100, the power consumption of the product can be reduced. Furthermore, the wheel driving device 100 or the cleaner robot becomes more flexible in design. In addition, the pair of wheel driving devices 320a and 320b in FIG. 8A are shown having the same structure. That is, the wheel driving device 320a has the same structure as that in FIG. 1A and FIG. 1B, and the wheel driving device 320b has the same structure as that in FIG. 2. In other words, both of the wheel driving devices 320a and 320b simultaneously drive a wheel and cleaner heads 322, 324. However, in another embodiment, one of the wheel driving devices is a structure driving only the wheel. For example, the wheel driving device in FIG. 3 may also be used as the wheel driving device 320b. In addition, the structures shown in FIG. 7A and FIG. 7B and variants thereof may also be used in the wheel driving devices 320a and 320b.

Figure 8B:
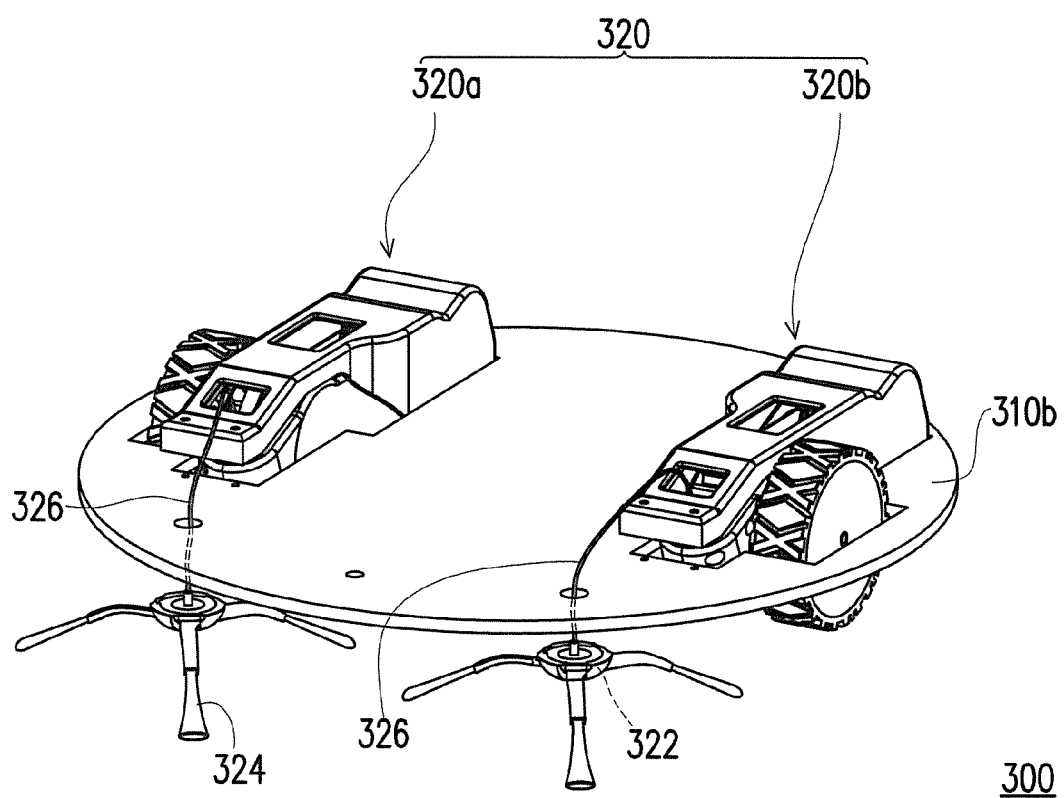
FIG. 8B is a perspective view showing a variant of a cleaner head in the cleaner robot.

Next, the cleaner heads 322 and 324 are explained. Generally, the cleaner heads 322 and 324 are often, for example, side brushes. The wheel driving devices 320a and 320b of the cleaner robot 300 shown in FIG. 8A both have a structure capable of simultaneously driving the cleaner heads 322 and 324. The cleaner heads 322 and 324 are respectively connected through a power transmission part 326 having flexibility. Hence, more flexible driving can be realized. In addition, as shown in FIG. 8B, the power transmission part 326 connected with the cleaner heads 322 and 324 may further penetrate the base 310b or the sidewall 310c. However, FIG. 8B shows, as an example, a case in which the base 310b is penetrated. Accordingly, when the cleaner robot 300 cleans the floor surface or a wall corner, the cleaning operation can be more flexibly and efficiently carried out.

Figure 9A:
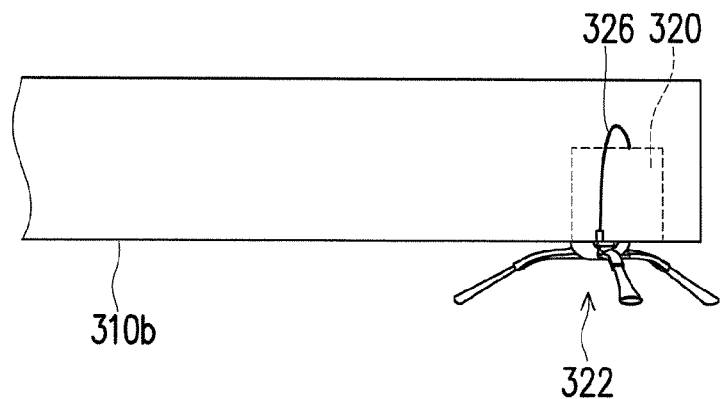
FIG. 9A is a schematic view showing an arrangement of the cleaner head.
Figure 9B:
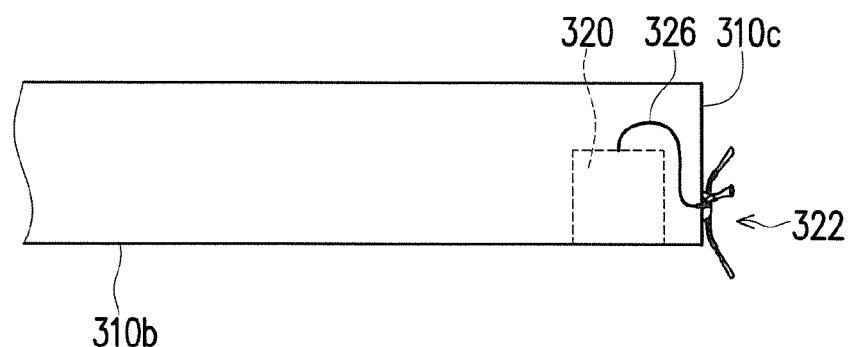
FIG. 9B is a schematic view showing an arrangement of the cleaner head.
Figure 9C:
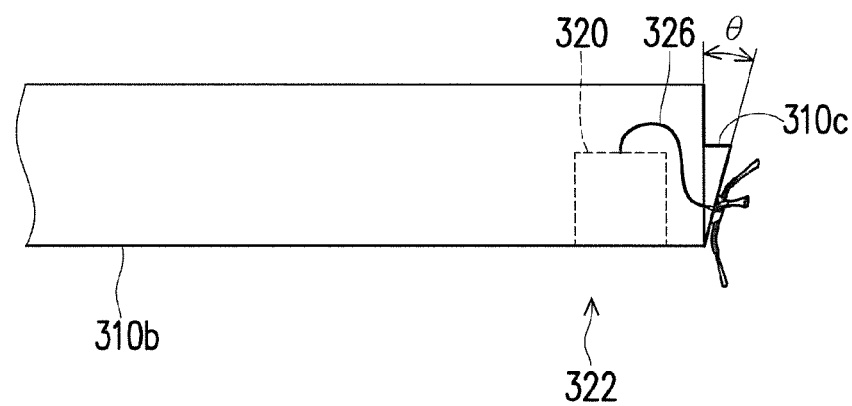
FIG. 9C is a schematic view showing an arrangement of the cleaner head.

In addition, the side brush of a conventional cleaner robot must be driven by another motor, and an arrangement position of the side brush is therefore limited. However, in the present embodiment, the motor of the wheel driving devices 320a and 320b simultaneously drives the wheel and the cleaner heads 322 and 324, and a flexible power transmission part (the power transmission part 30 in FIG. 1A, FIG. 1B and so on) is used for transmission of power to the cleaner heads 322 and 324. Therefore, design flexibility for the cleaner robot 300 can be further increased. That is, by the structure of the present embodiment, the side brush can be more flexibly arranged. FIG. 9A, FIG. 9B and FIG. 9C are schematic views showing arrangement positions of the cleaner heads 322 and 324 in the second embodiment. As shown in FIG. 9A, the side brush is arranged on the base 310b outside the housing 310. Accordingly, the side brush can be arranged in a place not occupying internal space of the housing. Since the power transmission part 30 is flexible, if necessary, it can be freely bent to be placed in a position not occupying the internal space of the housing. The side brush 322 can be arbitrarily arranged in a proper position on the base 310b. In addition, as shown in FIG. 9B, the side brush 322 may also be arranged on the sidewall 310c of the housing 310. Accordingly, a wall corner and an alcove can be cleaned by the side brush 322. In addition, the side brush 322 in FIG. 9B is disposed perpendicular to the sidewall 310c. However, the side brush 322 may also be inclined at a predetermined angle θ with respect to the sidewall 310c, as shown in FIG. 9C. Accordingly, a wall perpendicular to or inclined at a certain angle with respect to the floor surface can be cleaned.

Figure 10A:
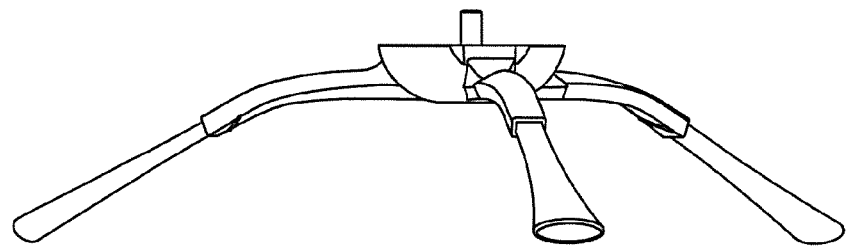
FIG. 10A is a schematic view showing a cleaner head.
Figure 10B:
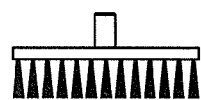
FIG. 10B is a schematic view showing a cleaner head.
Figure 10C:
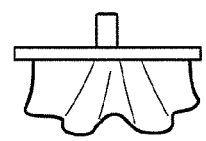
FIG. 10C is a schematic view showing a cleaner head.

In addition, the above explanations illustrate a case where a side brush as shown in, for example, FIG. 10A, which is often used in general cleaner robots, serves as the cleaner head. However, the cleaner head of the present embodiment may be other types of brushes. For example, the cleaner head may be a circular brush shown in FIG. 10B or a cleaner head with a dishcloth shown in FIG. 10C. Accordingly, the most suitable brush can be selected in accordance with the environment where the cleaner robot is used. In addition, the connection between the cleaner head and the power transmission part may be designed to be separately removable. In a formal product, various cleaner heads may be provided, and the user may replace the cleaner head on his/her own based on environment requirements.

As mentioned above, according to the wheel driving device of the present invention, since the motor simultaneously drives the wheel and the cleaner head, the number of motors to use can be decreased, the overall power consumption can be reduced, and the operating time of the wheel driving device can be increased. In addition, since the wheel driving device is connected to the cleaner head using the flexible power transmission part, the power transmission part can be arbitrarily bent inside the cleaner robot, and the cleaner head can be more freely arranged.

In addition, by using the flexible power transmission part along with decreasing the number of motors, since the space inside the cleaner robot is increased, and the suction module or dust collection box can be increased in size, the cleaning capability can be improved. In addition, since the arrangement position of the cleaner head is more flexible, the cleaner head can be arranged in the most suitable position and the cleaning capability can be further improved. Furthermore, the present invention provides the wheel driving device and the cleaner robot using the wheel driving device, so as to reduce power consumption by decreasing the number of motors and to enable design of a more flexible cleaner robot.

In addition, the present invention further adopts the one-way clutch. Since no flying-around of trash or dust is caused by reverse rotation of the cleaner head when the cleaner robot moves backward, cleaning efficiency is improved.

The exemplary embodiments of the present invention have been explained as above. However, the above explanations are not for limiting the present invention. As easily understood by persons skilled in the art, since appropriate alternations and modifications may be naturally performed within the scope of technical ideas of the present invention, the scope of patent protection shall be specified based on the scope of the claims and its equivalent range.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wheel driving device, comprising:
   a motor, rotating a shaft;
   an input gear, fixed to the shaft;
   at least one transmission gear, meshed with the input gear to transmit a power of the motor; and
   a final gear, meshed with the transmission gear and connected with a wheel via an axis to transmit the power from the transmission gear to the wheel;
   an extraction gear, meshed with the final gear or the transmission gear;
   a power transmission part, connected with the extraction gear to transmit the power from the extraction gear to a cleaner head; and
   a one-way clutch disposed between the power transmission part and the extraction gear.

2. The wheel driving device according to claim 1, wherein the motor, the input gear, the transmission gear, the final gear and the extraction gear are integrated to a single module.

3. The wheel driving device according to claim 1, wherein the motor, the input gear, the transmission gear and the final gear are integrated to a first module; and
   the extraction gear is formed as a second module.

4. The wheel driving device according to claim 1, wherein the power transmission part is formed by a member having flexibility.

5. The wheel driving device according to claim 4, wherein the power transmission part is a flexible shaft or a timing belt.

6. A cleaner robot, comprising
   a housing, comprising a base, a cover, and a sidewall surrounding the base and the cover; and
   a travel unit, disposed on the base inside the housing,
   wherein the travel unit comprises at least one pair of wheel driving devices, and at least one of the pair of the wheel driving devices is the wheel driving device according to claim 1.

7. The cleaner robot according to claim 6, wherein the cleaner head is a side brush, a circular brush, or a cleaner head with a dishcloth.

8. The cleaner robot according to claim 6, wherein the cleaner head is disposed on the base outside the housing.

9. The cleaner robot according to claim 6, wherein the cleaner head is disposed on the sidewall.

10. The cleaner robot according to claim 9, wherein the cleaner head is disposed perpendicular to the sidewall.

11. The cleaner robot according to claim 9, wherein the cleaner head is disposed inclined at a predetermined angle with respect to the sidewall.

12. The cleaner robot according to claim 6, wherein the power transmission part connected with the cleaner head further penetrates the base or the sidewall.

* * * * *